UNITED STATES PATENT OFFICE.

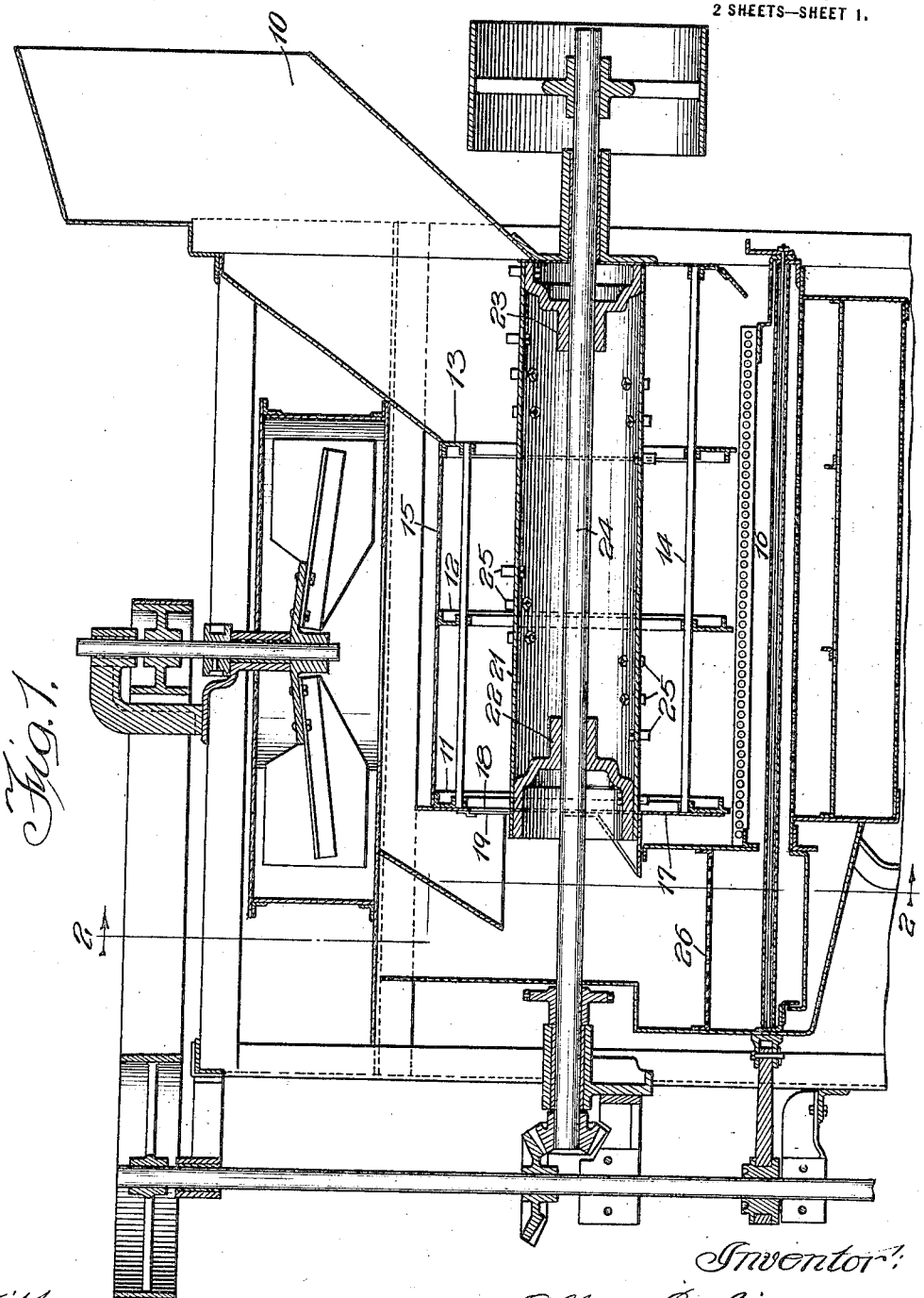

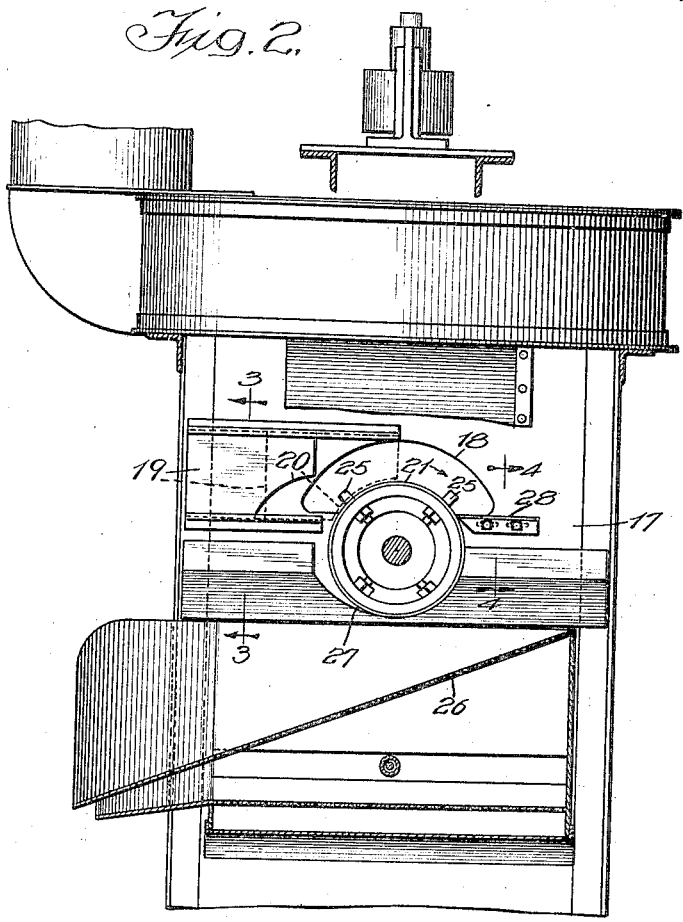
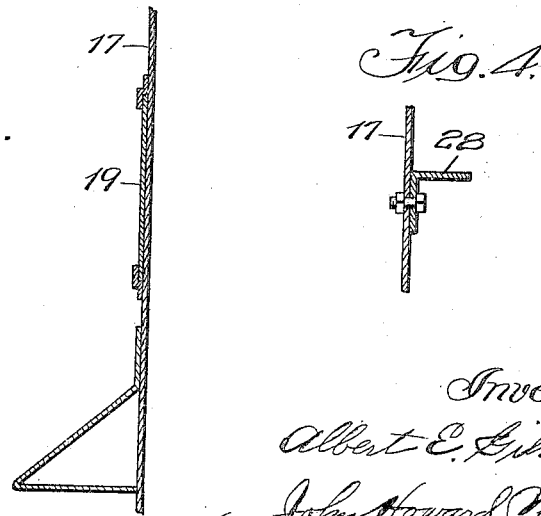

ALBERT E. GILMAN, OF OTTAWA, ILLINOIS, ASSIGNOR TO KING & HAMILTON COMPANY, OF OTTAWA, ILLINOIS, A CORPORATION OF ILLINOIS.

CORN-SHELLER.

1,390,030.  Specification of Letters Patent.  Patented Sept. 6, 1921.

Application filed May 12, 1921. Serial No. 468,864.

*To all whom it may concern:*

Be it known that I, ALBERT E. GILMAN, a citizen of the United States, and a resident of Ottawa, in the county of La Salle and State of Illinois, have invented certain new and useful Improvements in Corn-Shellers, of which the following is a full, clear, and exact specification.

My invention is concerned with corn shellers of the type shown in Letters Patent No. 1,322,303, issued November 18, 1919, to myself and John H. Gilman, and is designed to improve the operation thereof by constructing and mounting the shelling cylinder so that it will more certainly feed out the cobs and any husks which may be on the corn when it is introduced into the shelling concave.

To illustrate my invention I annex hereto two sheets of drawings, in which the same reference characters are used to designate identical parts in all the figures, of which—

Figure 1 is a central vertical longitudinal section through a corn sheller embodying my invention;

Fig. 2 is a section on the line 2—2 of Fig. 1; and

Figs. 3 and 4 are sections on an enlarged scale on the lines 3—3 and 4—4 of Fig. 2.

In the type of sheller shown in the above mentioned Patent No. 1,322,303, the corn to be shelled is fed into the hopper 10, descending into the shelling concave formed by the generally annular castings 11, 12 and 13 connected by the bars 14, forming the shelling concave proper. The concave is surrounded for the most part by the generally cylindrical sheet metal casing 15, which, however, is open at the bottom to allow the shelled corn to descend upon the riddle mechanism 16, by which it is separated from the impurities and delivered to the shelled corn conveyer. The discharge end of the shelling concave is closed by the customary sheet metal end 17, except for the generally segmental opening 18 therethrough seen in Fig. 2. This opening can be partially closed by the slide 19 having the lower inner corner cut away on curved lines as seen at 20, the curve being such as to coöperate with the correspondingly curved periphery 21 of the shelling cylinder which is made up of the heads 22 and 23 secured on the drive shaft 24 and having the cylinder 21 secured thereto at its ends, the cylinder 21 being provided with the customary shelling teeth 25. As these devices have been constructed prior to my invention, the shelling cylinder is terminated inside of the end plate 17, with the result that it not infrequently happens that husks which are carried by imperfectly husked corn or by jerked corn, wedge in between the end of the shelling cylinder and the end plate 17, and thus interfere with the operation of discharging the husks and cobs through the opening 18 on to the cob riddle 26. To obviate this difficulty, I form in the end 17 a circular aperture 27 of sufficient size to allow the end of the shelling cylinder to extend therethrough. This opening 27 of course merges with the discharge opening 18 above it. With this construction, I find that the husks can not get between the end of the shelling cylinder and the end of the concave casing, and that there is consequently no difficulty in discharging the cobs and husks through the opening 18.

As a further aid to keeping the cylinder cleaned of the husks at this point, I bolt or otherwise secure on the exterior of the plate 17 the scraper 28, seen in Fig. 2 and in section in Fig. 4. This scraper preferably consists of a small piece of angle iron having one end cut off diagonally as shown, with the point of the angle substantially in contact with the adjacent surface of the periphery of the shelling cylinder 21.

While I have shown and described my invention as embodied in the form which I at present consider best adapted to carry out its purposes, it will be understood that it is capable of modifications, and that I do not desire to be limited in the interpretation of the following claims, except as may be necessitated by the state of the prior art.

What I claim as new and desire to secure by Letters Patent of the United States is:

1. In a corn sheller, the combination with a shelling concave, closed at one end except for a feed opening and at the other end except for a circular aperture with an adjacent discharge aperture connected thereto, of a shelling cylinder concentrically journaled in the concave and having its discharge end extended through the circular aperture for the purpose described, and means for rotating the cylinder.

2. In a corn sheller, the combination with a shelling concave, closed at one end except for a feed opening, and at the other end except for a circular aperture with an adjacent crescent-shaped discharge aperture placed above and connected to the circular aperture, of a shelling cylinder concentrically journaled in the concave and having its discharge end extended through the circular aperture for the purpose described, means for rotating the cylinder, and a slide adapted to close a portion of said crescent-shaped discharge aperture and having its forward lower corner cut away on a curve corresponding to that of the periphery of the adjacent portion of the shelling cylinder.

3. In a corn sheller, the combination with a shelling concave, closed at one end except for a feed opening and at the other end except for a circular aperture with an adjacent discharge aperture connected thereto, of a shelling cylinder concentrically journaled in the concave and having its discharge end extended through the circular aperture for the purpose described, means for rotating the cylinder, and a scraper secured to the exterior of the discharge end of the concave just beneath the rear end of the discharge opening and coöperating with the cylinder.

In witness whereof, I have hereunto set my hand and affixed my seal, this fifth day of May, A. D. 1921.

ALBERT E. GILMAN. [L. S.]

Witness:
JOHN HOWARD McELROY.